United States Patent [19]

Takasaki et al.

[11] 4,330,856

[45] May 18, 1982

[54] DIGITAL SIGNAL TRANSMISSION SYSTEM INCLUDING MEANS FOR CONVERTING ASYNCHRONOUS SIGNALS TO THE OPERATING SPEED OF A TRANSMISSION LINE

[75] Inventors: Yoshitaka Takasaki, Tokorozawa; Hiroki Yoshine, Machida, both of Japan

[73] Assignee: Hitachi, Ltd., Tokyo, Japan

[21] Appl. No.: 118,919

[22] Filed: Feb. 6, 1980

[30] Foreign Application Priority Data

Feb. 19, 1979 [JP] Japan ................... 54/17341

[51] Int. Cl.³ ............................................. H04J 3/07
[52] U.S. Cl. ..................... 370/102; 370/109
[58] Field of Search ............... 370/102, 109, 84, 91; 179/15.55 T, 15.55 R; 375/114; 340/347

[56] References Cited

U.S. PATENT DOCUMENTS 3,636,524 1/1972 Holland ........................... 370/109
4,058,683 11/1977 Fenoglio ......................... 370/102
4,196,315 4/1980 Boutmy et al. ................ 370/102

Primary Examiner—Douglas W. Olms
Attorney, Agent, or Firm—Craig and Antonelli

[57] ABSTRACT

In a digital signal transmission system wherein input digital signals having an arbitrary bit rate are converted into digital signals of a bit rate higher than that of the input digital signals and then transmitted through a signal format converter; in order to realize the signal format conversion in real time the signal format converter is constructed of a buffer circuit of small capacity, a circuit which writes the input signals into the buffer circuit at the bit rate of said input signals and which reads out the written signals at the bit rate of a transmission line, a circuit which distinguishes the signals to-be-read as a mark, space and empty, and an encoding circuit which converts the mark, space and empty into pulse signals discernible with the unit being a time slot of the transmission line or integral times the time slot, in dependence of the levels of pulses or the numbers of successive pulses (run length).

13 Claims, 25 Drawing Figures

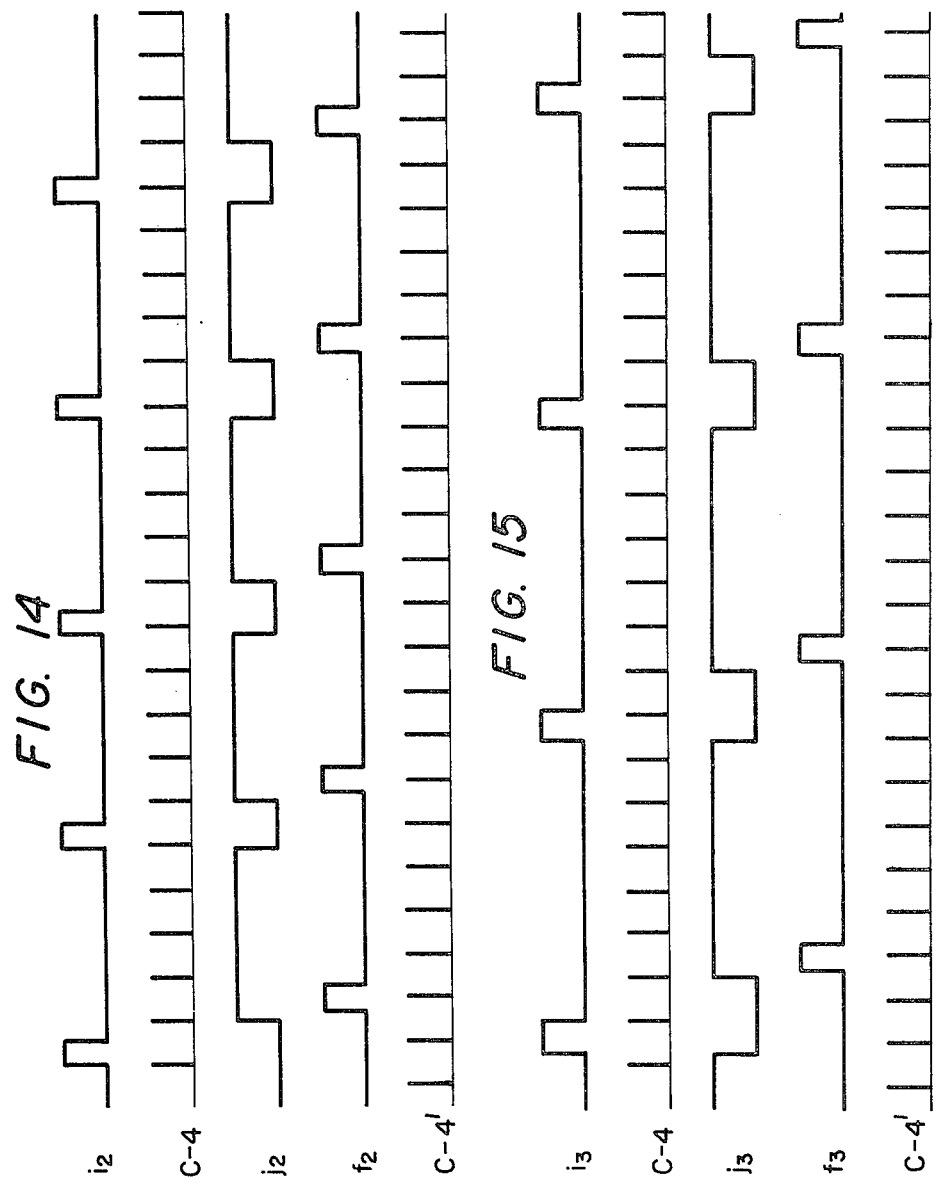

DIGITAL SIGNAL TRANSMISSION SYSTEM INCLUDING MEANS FOR CONVERTING ASYNCHRONOUS SIGNALS TO THE OPERATING SPEED OF A TRANSMISSION LINE

BACKGROUND OF THE INVENTION (1) Field of the Invention

This invention relates to a digital signal transmission system. More particularly, it relates to a digital signal transmission system in which when the operating speed or bit rate of signals to be transmitted is unequal to the operating speed of a transmission line including repeaters etc., the signals are converted and synchronized with the operating speed of the transmission line and then the resulting signals are transmitted.

(2) Description of the Prior Art

In a prior-art digital signal transmission system, the bit rate of a transmission line is designed so as to be equal to the bit rate of digital signals to-be-transmitted. Accordingly, when the bit rate of digital signals is unequal to that of the transmission line, they cannot be directly transmitted.

Therefore, signal format converters for synchronizing the signals with the bit rate of the transmission line need to be disposed at sending and receiving terminals. In this case, buffer circuits are necessary. It is difficult, however, to perform the writing of inputs and the reading of outputs of the buffer circuit continuously, i.e., in real time. For this reason, signals which can be synchronized by disposing the buffer circuits have been limited to special digital signals, for example, signals of the start-stop method. Further, it has been considered impossible to multiplex a plurality of asynchronous signals. In general, accordingly, it is proposed to set the bit rate of the transmission line in conformity with the bit period of the signals to-be-transmitted or to set the bit period of the digital signals in conformity with the bit rate of the transmission line.

With the progress of the digital processing technology, however, sending terminals or channels which generate many kinds of digital signals of unequal bit rates have increased. Also in the transmission line, at the present time at which high-speed transmission has become possible with a transmission medium of very wide band, such as an optical fiber, if signals having arbitrary bit rates can be transmitted irrespective of the bit rate of the transmission line, the economical utilization of the transmission line can be achieved very advantageously.

It is also considered that if the signals can be transmitted in a multiplexed manner, the ease of use as the transmission line will be enhanced.

SUMMARY OF THE INVENTION

It is accordingly the principal object of this invention to realize a digital signal transmission system in which any desired digital signal having a bit period greater than the bit period of a transmission line is synchronized with the transmission line in real time and then transmitted.

Another object of this invention is to realize a digital signal transmission system in which asynchronous digital signals with arbitrary bit rates are multiplexed and synchronized with a single transmission line and then transmitted.

In order to accomplish the objects, this invention consists in a digital transmission system wherein digital input signals from a sending terminal or the like having an arbitrary bit rate are converted into digital signals having a higher bit rate (shorter bit period) than the input signals and then are transmitted through a signal format converter; said signal format converter comprising a buffer circuit of small capacity, means for writing the input signals into said buffer circuit at the bit rate of said input signals, means for reading out the written signals from said buffer circuit at a bit rate higher than that of said input signals, and an encoder which discerns a mark and a space of the read signals and an empty indicating nonexistence of any signal to-be-read-out and which, in case of the empty, inserts a dummy signal made up of a combination of pulses having a read-out bit period as a code discernible from signals corresponding to the mark and the space.

The "combination of pulses having a bit period" which corresponds to the dummy signal incorporates various embodiments as will be stated later. It even includes a case of a single pulse, and also a case of level zero.

In the digital transmission system of this invention, the redundant pulses for dummy are inserted bit-wise between the adjacent information bits (bits corresponding to the mark and space). That is, the redundant pulses for dummy whose widths being integral multiples of the read-out bit period are added between the information bits without affecting the synchronization of the information pulses. Moreover, in the system of this invention, the levels of the output signals or the numbers of the succession of pulses of an identical level are adaptively controlled depending upon the relation between the written and read signals of the buffer circuit, and in accordance with the states of the memories in the buffer.

Further, in the transmission system of this invention, the signals to be transmitted are not restricted to single-channel signals, but digital signals of a plurality of channels having mutually different bit rates can be multiplexed and transmitted by means of a single transmission line.

In the digital signal transmission system of this invention, the signal format converter adaptively converts the digital signals. Therefore, the very effective expedient is provided that even when the bit rates of the signals of the sending and receiving terminals coupled to the identical transmission line have fluctuated or have been changed-over, the circuit of the transmission line can be used without any alteration.

In addition, the signals to be transmitted need not be restricted to special digital signals.

The above-mentioned and other features and objects of this invention will become more apparent by reference to the following description taken in conjunction with the accompanying drawings.

DESCRIPTION OF THE PREFERRED EMBODIMENTS

Figure 1:
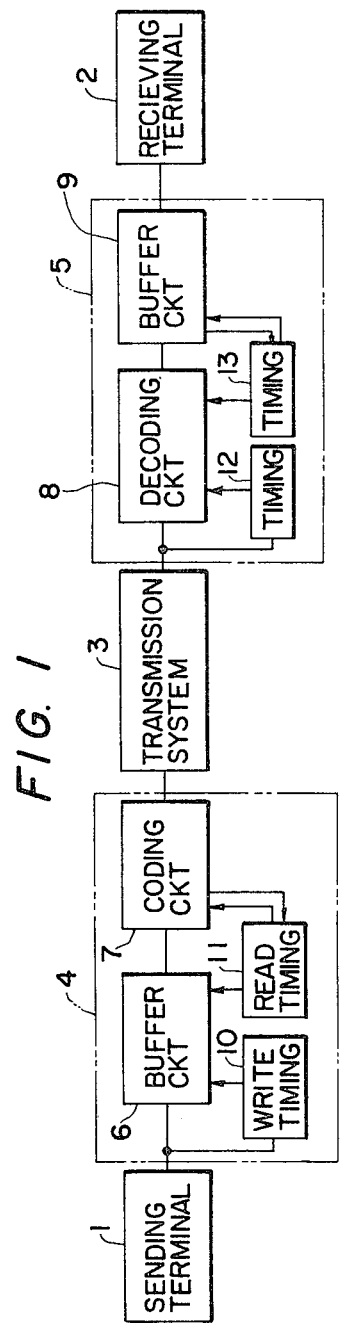
FIG. 1 is a block diagram showing the general construction in which a digital signal transmission system according to this invention is performed.

FIG. 1 is a block diagram showing the whole construction of an embodiment in which the digital signal transmission of this invention is performed.

Referring to the figure, numeral 1 designates a sending terminal which is a portion for generating digital signals to be transmitted, such as video information, voice and data. Numeral 3 designates a transmission line which includes such devices as repeaters. Numeral 2 indicates a receiving terminal which is a portion for decoding the original signals of the sending terminal. Any specified condition is not required except that the operating speed or bit rate (for example, 50 Mbits/s) of the transmission line and the operating speed of the sending and receiving terminals are unequal and that the bit rate of the sending and receiving terminals lies in a range (for example, 2 kbits/s–50 Mbits/s) lower than the bit rate of the transmission line. In order to synchronize with the transmission line such signals asynchronous with the transmission line, signal format converters 4 and 5 are arranged between the sending and receiving terminals and the transmission line. A buffer circuit 6 of the signal format converter 4 writes the input signals at the bit rate of these input signals by the use of writing signals from a timing signal (clock signal) generator 10. Signals of the buffer circuit 6 are read out at the timing of the transmission line 3 by the use of reading signals from a timing signal generator 11. A circuit 7 is an encoder which converts the read-out signals into signals capable of discerning the kinds of the former signals, i.e., mark, space and empty in accordance with rules to be exemplified later, in other words, into signals with at least either the levels of pulses or the numbers of succession of pulses controlled, and which transmits the latter signals to the transmission line 3. The signal format converter 5 for the receiving terminal 2 demodulates the original signals by an operation which is inverse to that of the signal format converter 4 in principle. A circuit 8 is a decoder which executes an operation inverse to that of the circuit 7. Numeral 9 indicates a buffer circuit, numeral 12 a timing signal generator for the transmission line, and numeral 13 a circuit for generating operating timing signals of the terminal.

Figure 2:
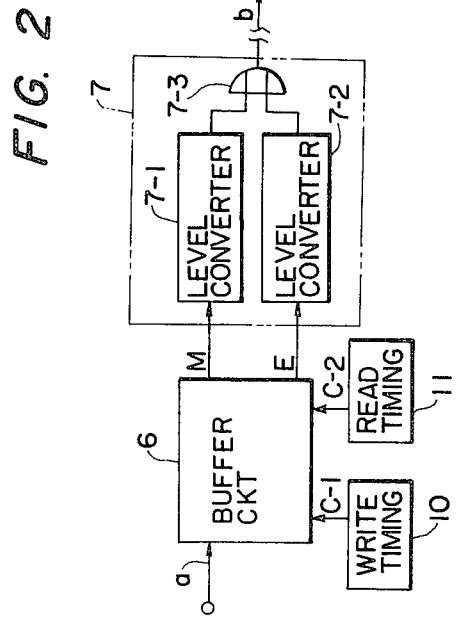
FIGS. 2, 4, 6 and 8 are block diagrams each showing an embodiment of a signal format converter for use in the digital signal transmission system according to this invention.
Figure 3:
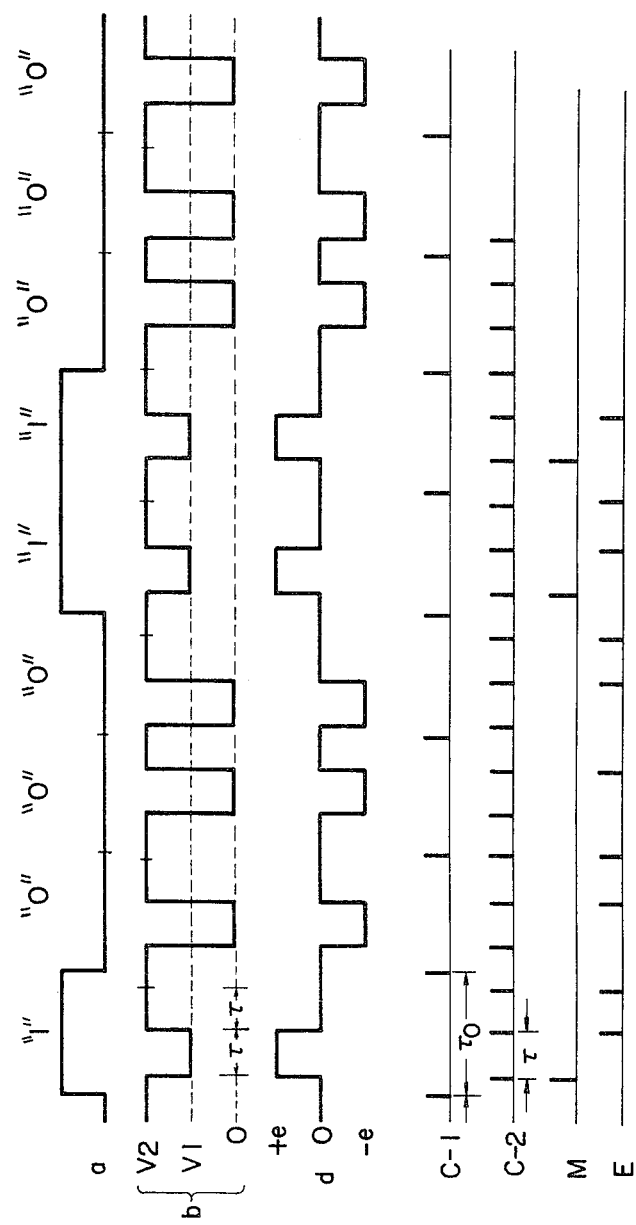
FIGS. 3, 5, 7, 9, 10 and 11 are waveform diagrams for explaining the operations of the embodiments.

FIG. 2 is a block diagram showing the construction of the signal format converter portion in an embodiment of the transmission system according to this invention, while FIG. 3 is a time chart for explaining the operation of the portion. In case where the signal to be transmitted is an NRZ signal as shown at a in FIG. 3 and is written into the buffer circuit 6 at the bit rate c-1 of the sending terminal and where it is read out from the buffer circuit 6 by the clock signal c-2 (whose clock period is denoted by $\tau$) determining the operating speed of the transmission line, the reading clock c-2 is higher in speed than the writing clock c-1, and a signal M corresponding to the signal "1" (mark) and a signal E corresponding to the empty are obtained from the buffer circuit. (A signal S corresponding to the signal "0" (space) is also obtained, but it is not used in the present embodiment.) The signal M is converted by a level converter 7-1 into a signal having a level $v_1$ and a pulse width $\tau$, while the signal E is converted by a level converter 7-2 into a signal having a level $v_2$ and a pulse width $\tau$. The resulting signals are added by an OR gate 7-3 and then delivered to the transmission line. Accordingly, the input signal a becomes a three-valued transmission signal as shown at b. In the receiving terminal, the signals M and S except the signal E are converted by a level discriminator 8-1 into signals of levels $+e$ and $-e$ as shown at d in FIG. 3, respectively, and the signal d is written into the buffer circuit 9. The timing signal generator 13 makes the timing signal of the original signal by counting the pulses in the signal d, converting their mean frequency into a voltage and controlling a voltage-controlled oscillator. Using this timing signal, the signal is read out from the buffer circuit so as to demodulate the original signal a.

In the present embodiment, information signal pulses (information pulses corresponding to the mark M and the space S) are converted into codes capable of discerning the signals M, S and E, the number of succession of the E pulses where E pulses whose levels are different from the levels of the information pulses are incorporated and of course, the setting of the levels of the E pulses can be variously altered.

Figure 5:
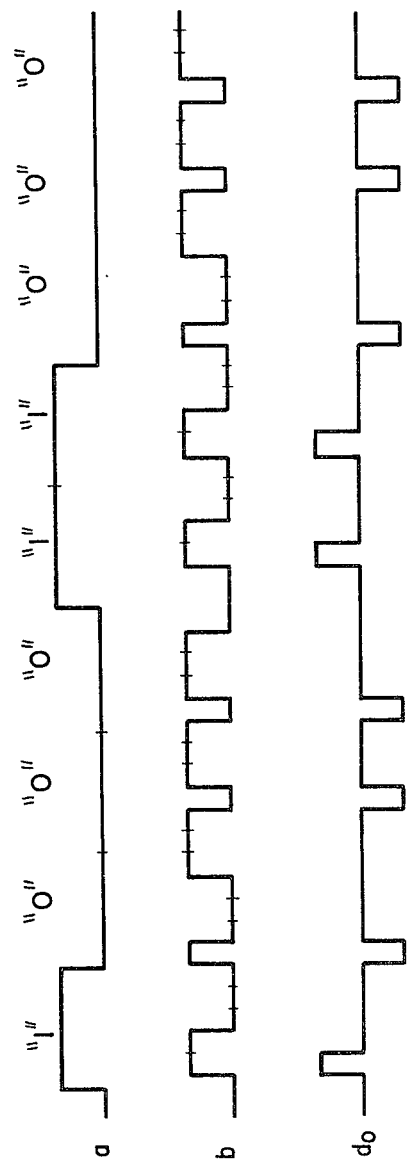
Figure 4:
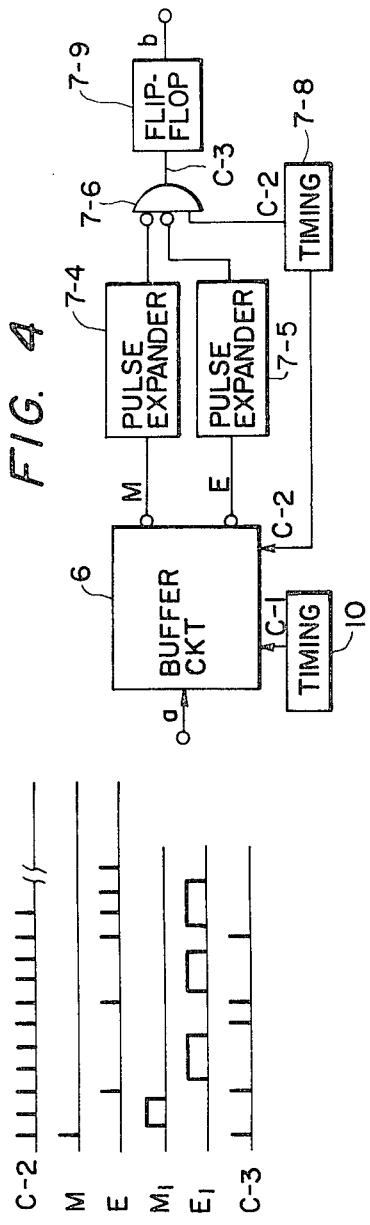

FIG. 4 is a circuit diagram showing the signal format converter in the sending terminal in another embodiment of the transmission system according to this invention, while FIG. 5 is a time chart for explaining the operation of the circuit. A signal M for the mark and a signal E for the empty are provided as the read-out outputs from the buffer circuit 6, similarly to the case of FIG. 2. These signals M and E are respectively converted by pulse expanders 7-4 and 7-5 into signals $M_1$ and $E_1$ with expanded pulse widths, and the resulting signals are applied to an AND gate 7-6 as inhibit signals. Since the AND gate 7-6 has the timing signal c-2 of the transmission line applied thereto, its output becomes as shown at c-3. When a trigger type flip-flop 7-9 is driven by the signal c-3, a transmission signal as shown at b in FIG. 5 is obtained. More specifically, the signal M corresponding to the mark "1" of the original signal is converted into two successive pulse intervals each having the clock period width $\tau$ of the transmission line, the signal S corresponding to the space "0" is converted into a single pulse interval, and the interspace between these information pulses is filled up with three successive pulse intervals $3\tau$, and the levels vary every $\tau$, $2\tau$ or $3\tau$ alternately. That is, the converted signals can discern the signals M, S and E by the numbers of succession of timeslots of the identical level. In the receiving portion (not shown), only such pulses, among those in the transmission signal b, that have the pulse widths $\tau$ and $2\tau$ are detected and are converted into a signal $d_o$, and the original signal a can be readily demodulated by the same principle as explained with reference to FIGS. 2 and 3.

Of course, the relation between the mark M and the space S can be reversed, and the polarities of the pulses can be reversed. The numbers of the successive pulses can also be appropriately altered depending on the bit rate.

Figure 6:
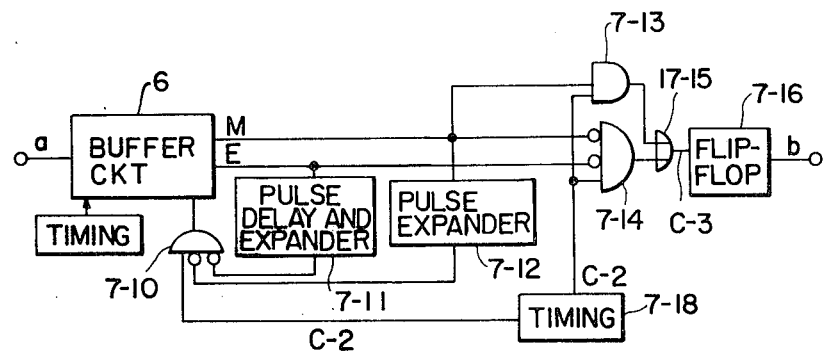
Figure 7:
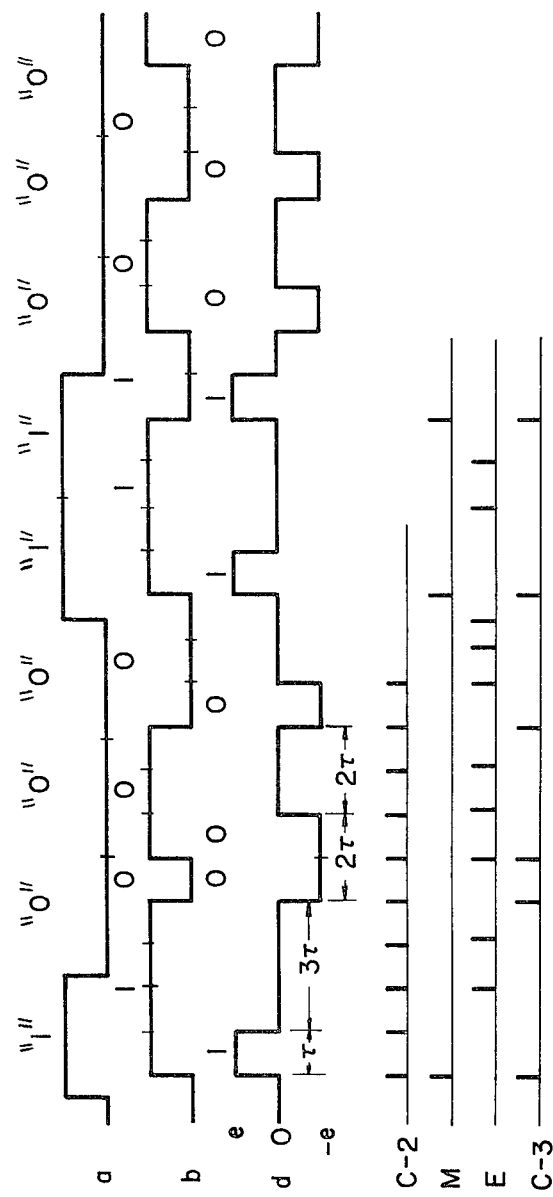

FIG. 6 is a circuit diagram of the signal format converter in the sending terminal in another embodiment of the digital signal transmission system according to this invention, while FIG. 7 is a time chart for explaining the operation of the circuit.

In the present embodiment, when a signal converted by the signal format converter is the mark M it is converted into a pulse signal with a width which is an even number times the clock period $\tau$ of the transmisson line, and when it is the space S it is converted into a pulse signal with a width which is an odd number times the clock period $\tau$ of the transmission line. Of course, this relation may well be reversed. In the present example, the pulses for redundancy are not inserted as in the foregoing examples, and the numbers of succession of pulses of a pulse width $\tau$ and an identical level are adaptively controlled within the range of the conditions. According to the circuit of the embodiment of FIG. 6, a clock signal c-2 from a clock signal source 7-18 of the transmission line is applied to the buffer circuit 6 through an AND gate 7-10. When the signal mark M has been read out, an AND gate 7-13 is enabled to apply a clock signal c-3 to a flip-flop 7-16 through an OR gate 7-15. Simultaneously, the signal M is applied as an inhibit signal to the AND gate 7-10 through a pulse delaying and extending circuit 7-12 so as to block the next reading. When the signal E for the empty has been generated, the clock signal c-2 is blocked by an AND gate 7-14, and simultaneously, the next reading from the buffer circuit 6 is blocked by a pulse delaying and extending circuit 7-11. When neither the signal E nor the signal M exists, the AND gate 7-14 is enabled, so that a signal indicative of the space signal S is applied to the flip-flop 7-16 through the OR gate 7-15. Therefore, the signal applied to the flip-flop 7-16 is c-3 and the output thereof becomes as shown at b in FIG. 7.

In the receiving portion, the pulses of the width which are an even number times $\tau$ among the received pulses b are converted into pulses of a level $+e$ and a width $\tau$ and the pulses of the width which are an odd number times $\tau$ are converted into pulses of a level $-e$ and a width $\tau$, and the resulting pulses are sequentially written into the buffer memory and read out at the clock period $\tau_o$ of the original signals, whereby the original signals can be decoded.

The above embodiments have been stated concerning the case where the input digital signals to be converted are of one channel. However, one of the important advantages of the digital signal transmission system according to this invention is that signals of a plurality of channels can also be multiplexed and transmitted.

Hereunder, for the sake of convenience, there will be described a case where three input digital signals whose bit rates differ from one another are multiplexed and transmitted.

Figure 8:
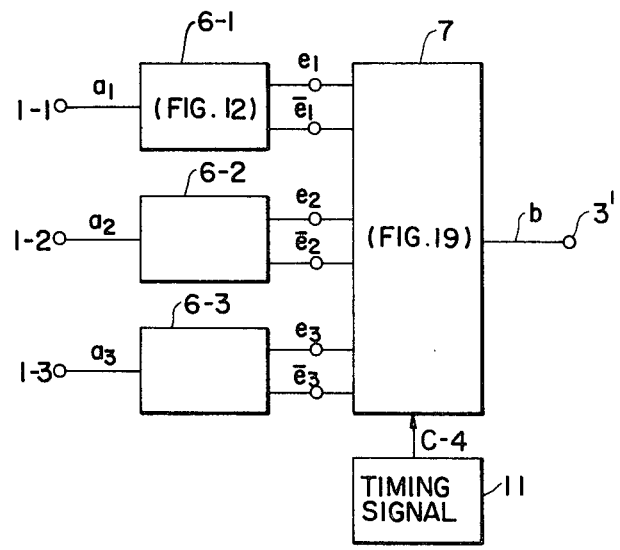

FIG. 8 shows the whole construction of a signal format converter at the time when the digital signal transmission system according to this invention is applied to the case of multiplexing and transmitting digital signals of three channels.

NRZ digital signals $a_1$, $a_2$ and $a_3$ of unequal bit rates are respectively applied to input terminals 1-1, 1-2 and 1-3. Since the bit rates of these input signals are unequal, the bit periods thereof are unequal as being $\tau_1$, $\tau_2$ and $\tau_3$ ($\tau_1 < \tau_2 < \tau_3$) respectively. The signals are written into buffer circuits 6-1, 6-2 and 6-3 at the respective bit rates, and are converted into signals $e_1$, $\overline{e_1}$; $e_2$, $\overline{e_2}$ and $e_3$, $\overline{e_3}$. Here, $\overline{e_1}$, $\overline{e_2}$ and $\overline{e_3}$ denote that the polarities of these output levels are opposite to those of $e_1$, $e_2$ and $e_3$ respectively. The converted signals are turned into multiplexed pulse signals in conformity with fixed rules in a multiplexing encoder 7, and the resulting signals are delivered from an output terminal 3' to a transmission line.

These circuits are clocked by a signal c-4 from a clock signal source 11 as determines the bit rate of the transmission line.

Before describing a concrete circuit arrangement, the outline of operations will be described with reference to waveform diagrams of FIGS. 9 and 10.

Figure 9:
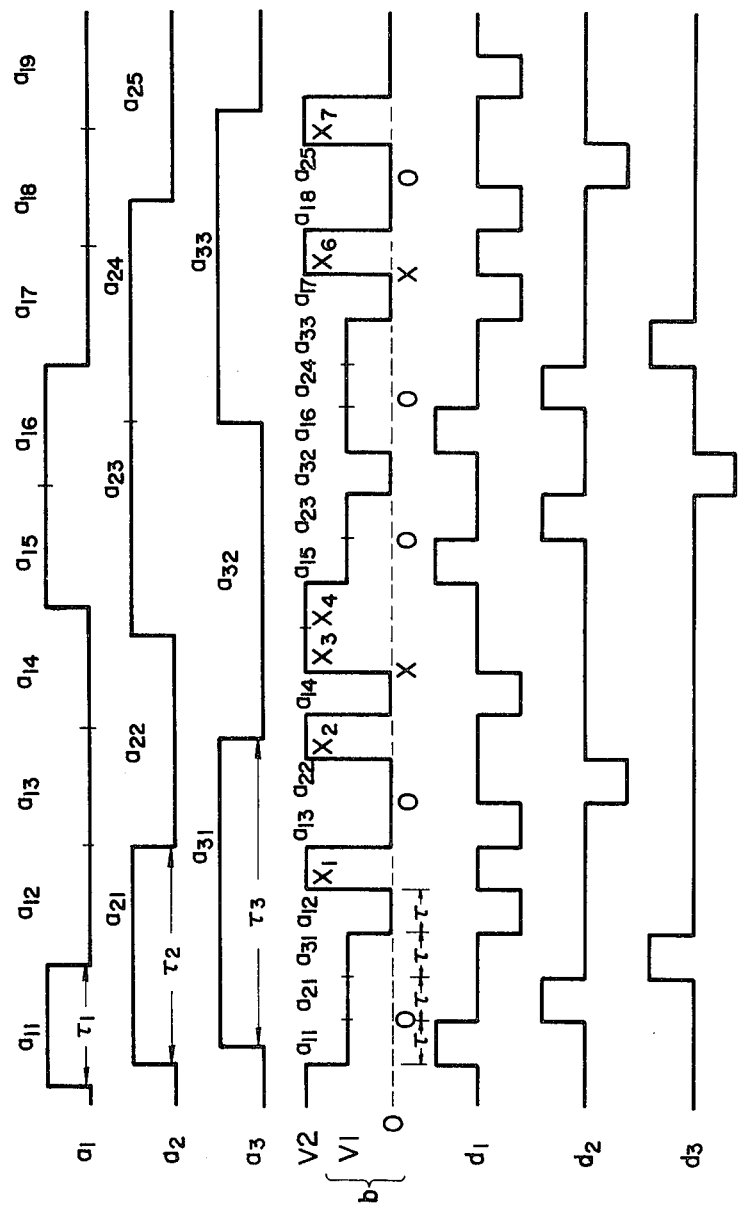

In the example of FIG. 9, the three input digital signals (having the bit periods $\tau_1$, $\tau_2$ and $\tau_3$ respectively) $a_1$, $a_2$ and $a_3$ with bit rates lower than the bit rate of the transmission line (having a bit period $\tau$) are converted by the same principle as explained with reference to FIG. 3 into pulses having widths equal to the bit period $\tau$ of the transmission line as shown in signal b and than multiplexed. Here, symbols $a_{mn}$ (m=1, 2 or 3; n=1, 2, ...) over waveforms in the drawing denote bit information of the respective digital signals, letter n denotes a bit order, and letter m denotes a channel. $X_n$ indicates a redundant pulse.

In order to multiplex the original signals, they are circulatively converted in the order of the bit rate. In the multiplexed signal b, signal bits are arrayed as $a_{11}$, $a_{21}$ and $a_{31}$ in order of original signals $a_1$, $a_2$ and $a_3$, whereupon signal bit $a_{12}$ appears, returning to the original signal $a_1$ again. The signal bit $a_{12}$ is followed by a redundant pulse $X_1$ of level $v_2$. Since a signal bit $a_{22}$ of the original signal $a_2$ expected to come next is not generated yet. In conformity with the rule that the original signal $a_1$ of the highest bit rate necessarily begins next to the redundant pulse or pulses (this rule facilitates the restoration on the receiving side), a time slot $a_{13}$ is subsequently arrayed and thereafter the signal bit $a_{22}$ comes.

The arrayal is similarly made in succession, whereby the converted and multiplexed transmission signal b is obtained.

In the receiving portion, the multiplexed transmission signal b is distributed taking into consideration the above mentioned conversion rule, to result in signals $d_1$, $d_2$ and $d_3$. These signals are respectively rearranged to obtain original signals $a_1$, $a_2$ and $a_3$.

Figure 10:
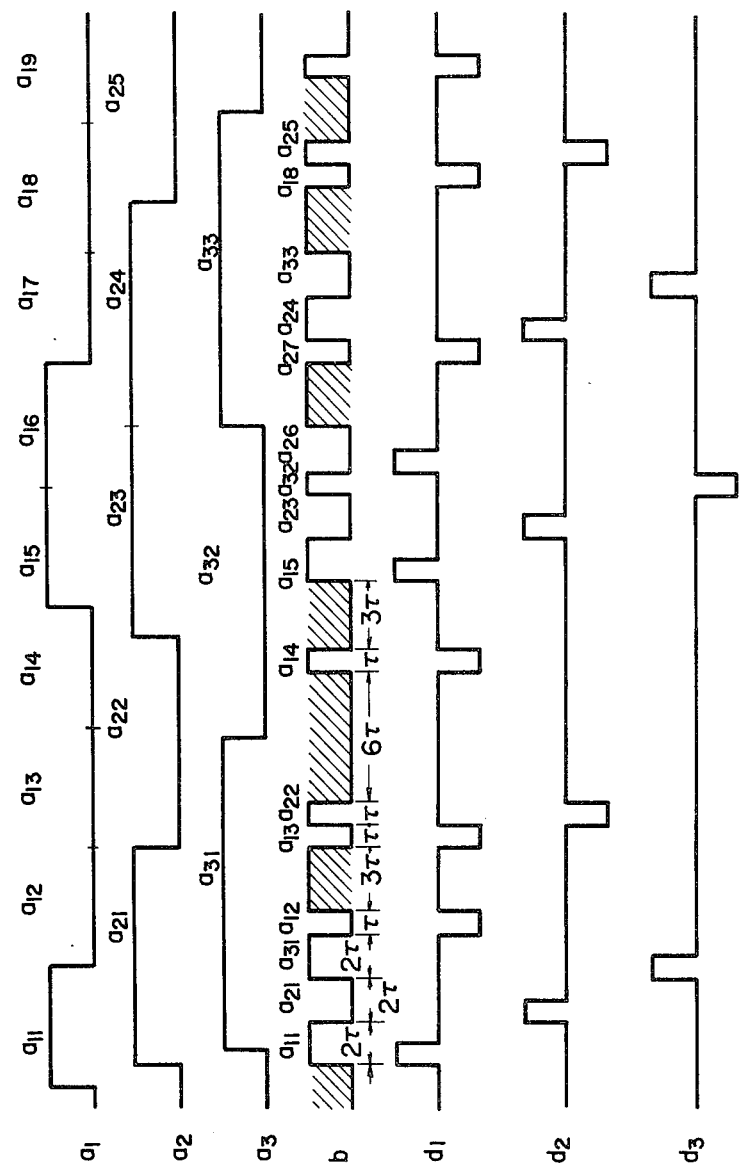

The rule of signal conversion in FIG. 10 is similar to that in FIG. 5 in principle, except for the multiplexing rule: the rule that upon occurrence of the redundant signal the conversion is made returning to the signal with the highest bit rate. This is similar to the case of FIG. 9.

In order to realize the multiplexed transmission of the present embodiment, the bit rate or clock frequency of the transmission line needs to be at least $$t_s \sum_{i=1}^{n} f_i + L_r(f_1 - f_n),$$

where the bit rates of the plurality of signal channels are $f_1, f_2, \ldots$ and $f_n$ ($f_1 \geq f_2 \geq f_3 \ldots \geq f_n$) respectively and where a single pulse in the original signal is converted into a run length $L_s$ times the transmission clock period, while the redundant bit is converted into a run length $L_r$ times the clock period.

Figure 11:
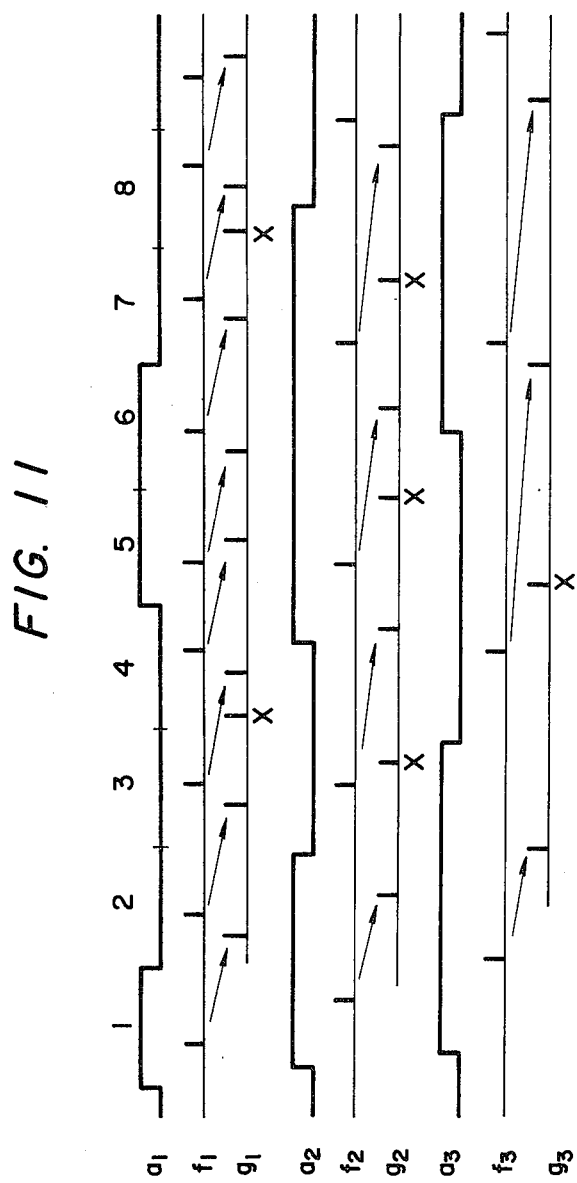

FIG. 11 illustrates the time relationships among the clock signals $f_1$, $f_2$ and $f_3$ which determine the writing times of the memory of the input signals $a_1$, $a_2$ and $a_3$ for the respective buffer circuits 6-1, 6-2 and 6-3 in FIG. 8. The clock signals $g_1$, $g_2$ and $g_3$ determine the reading times for the written signals from the respective buffer circuits.

In the figure, crosses indicate that no reading has been made because information to be read out has not reached the buffer yet. That is, they indicate the empty E.

Now, the construction and operation of the buffer circuits will be explained. Circuit 6-1 will be described in detail since the three buffer circuits 6-1, 6-2 and 6-3 have an identical construction.

Figure 12:
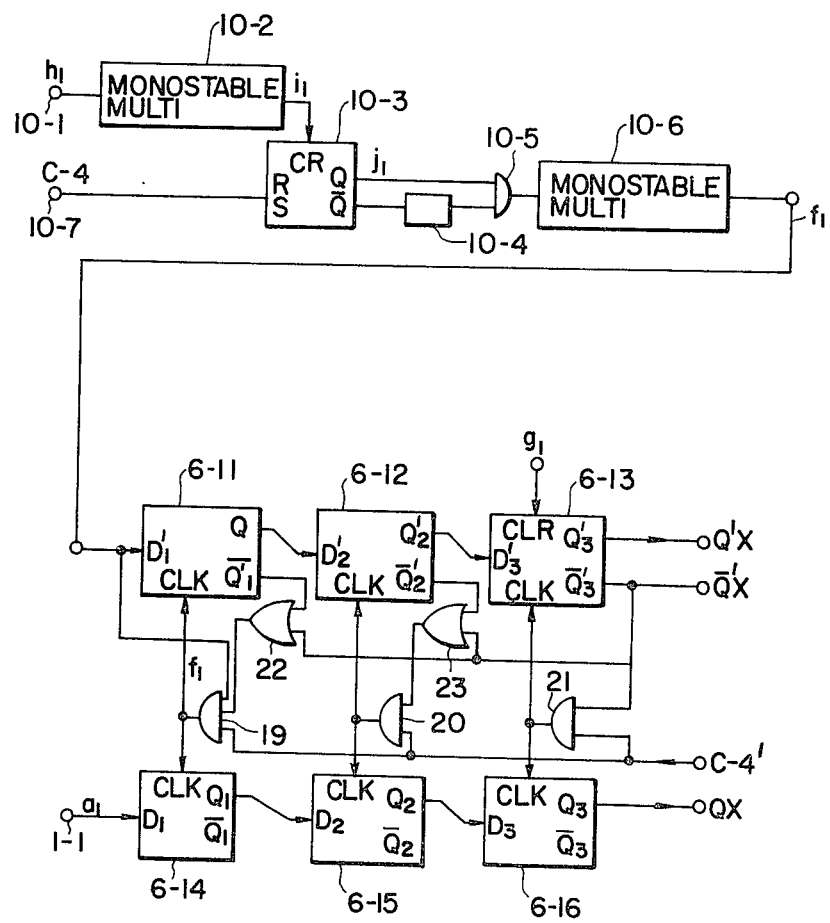
FIG. 12 is a circuit diagram of an embodiment of a buffer circuit in FIG. 8, FIGS. 13 to 18 are waveform diagrams for explaining operations in FIG. 12.
Figure 13:
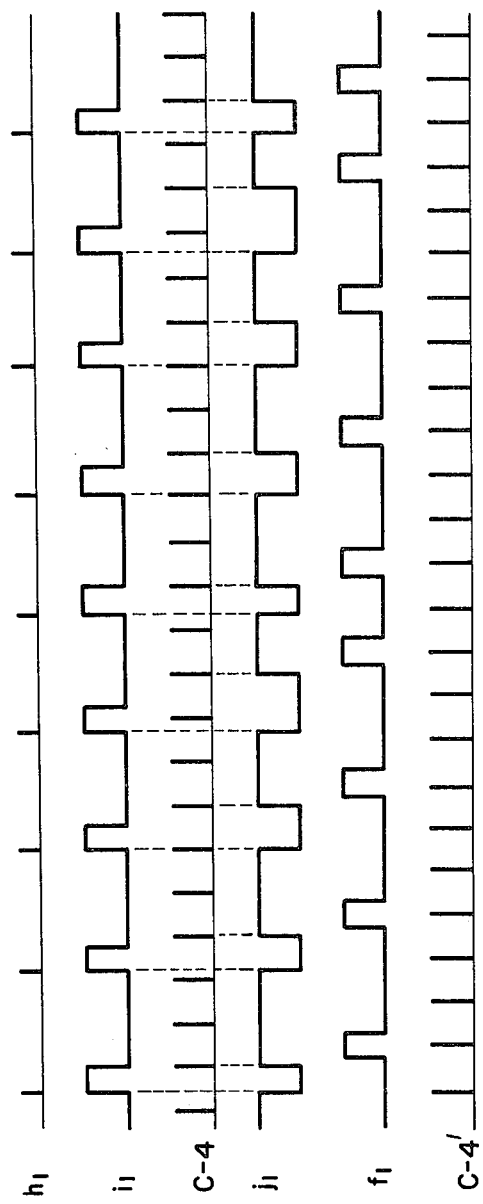

The upper portion in FIG. 12 is the portion for producing the writing signal $f_1$, and FIG. 13 shows time charts for explaining the operations of various parts of the portion. A clock signal $h_1$ in synchronism with the original signal $a_1$ is applied to a terminal 10-1 (the clock signal $h_1$ is obtained from the original signal circuit). This signal $h_1$ has its pulse width extended by a monostable multivibrator 10-2, and is applied as a clear signal $i_1$ to a flip-flop circuit 10-3. On the other hand, a clock signal c-4 in synchronism with the transmission line is applied to the set terminal S of the flip-flop 10-3 via an input terminal 10-7. Accordingly, a signal $j_1$ appears at the output terminal Q of flip-flop circuit 10-3. The signal $j_1$ and the signal obtained by delaying the signal from "not" terminal $\overline{Q}$ of the flip-flop 10-3 with a polarity-inverting delay circuit 10-4 are applied to AND gate 10-5. The output signal of AND gate 10-5 is applied to a monostable multivibrator 10-6 in order to extend the pulse width thereof, and the resulting output is used as the writing signal $f_1$. The above circuit arrangement is one for synchronizing the timing signal of the input signal with the transmission line, or the timing signal of the reading signal.

The other buffer circuits 6-2 and 6-3 have similar circuits, and their operations are illustrated in time charts of FIGS. 14 and 15.

A buffer memory consists of a circuit which is composed of three D-type flip-flops 6-11, 6-12 and 6-13 connected in series (a portion for displaying the presence or absence of a signal), and a circuit which is composed of three D-type flip-flop circuits 6-14, 6-15 and 6-16 connected in series (a portion for storing signals). As is generally known well, the D-type flip-flop is a circuit wherein a signal applied to the terminal D thereof is shifted to the output terminal Q thereof when a clock pulse is impressed on the terminal CLK thereof.

The operation of the buffer memory will be described with reference to the time charts in FIG. 16.

The writing signal $f_1$ is applied to the input terminal $D'_1$ of the flip-flop circuit 6-11, while the input signal $a_1$ is applied to the input terminal $D_1$ of the flip-flop 6-14, and they are shifted rightwards each time the signal is applied to the terminals CLK of the respective flip-flop circuits. An AND gate 19 and an OR gate 22 are connected so that the clock signal may be applied to the terminals CLK of the flip-flop circuits 6-11 and 6-14 when a clock signal c-4' and the writing signal $f_1$ becomes "1" and at least one of the output $\overline{Q'_1}$ of the flip-flop 6-11 and the output $\overline{Q'_3}$ of the flip-flop 6-13 becomes "1". The terminals CLK of the flip-flops 6-12 and 6-15 have the signal applied thereto when the clock signal c-4' and at least one signal of the outputs $\overline{Q'_2}$ and $\overline{Q'_3}$ of the respective flip-flops 6-12 and 6-13 are "1".

Accordingly, the original signal $a_1$ applied to the terminal $D_1$ of the flip-flop 6-14 is shifted upon the application of the clock pulse c-4' in case where the memory of the preceding stage is "empty", that is, the terminal $\overline{Q'_1}$ of the upper-stage flip-flop 6-11 indicates "1", or in case where the output $\overline{Q'_3}$ of the flip-flop 6-13 is "1". The fact that the output $\overline{Q'_1}$ is "1" signifies that this stage is empty, and when the output $\overline{Q'_3}$ is "1" it is signified that the read-out has been made. Similar operations are carried out for the flip-flops 6-12, 6-15, 6-13 and 6-16 of the other stages, to hold time relationships as illustrated at $Q'_1, Q'_2, Q'_3, Q_1, Q_2$ and $Q_3$ in FIG. 16.

Figure 16:
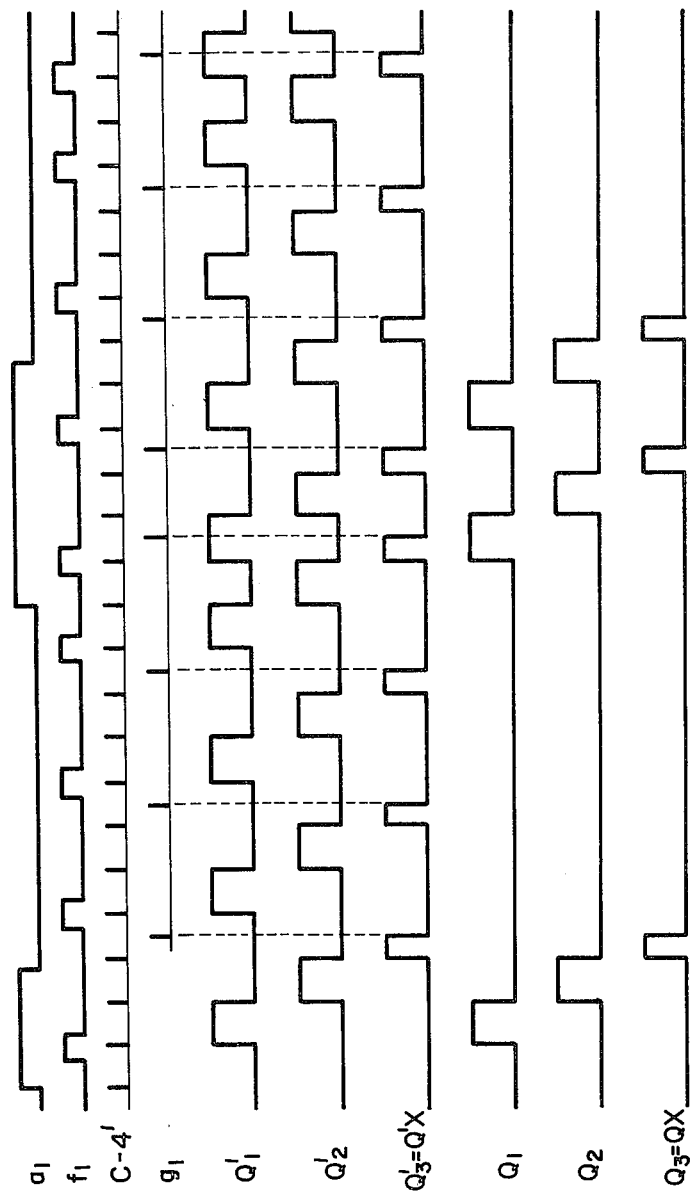

The example shown in the time chart of FIG. 16 is the case where the signal is stored in only one stage of the three stages at all times. In actuality, however, signals enter two or more stages in some cases. The buffer memory therefore fulfills the function of the buffer.

Figure 17:
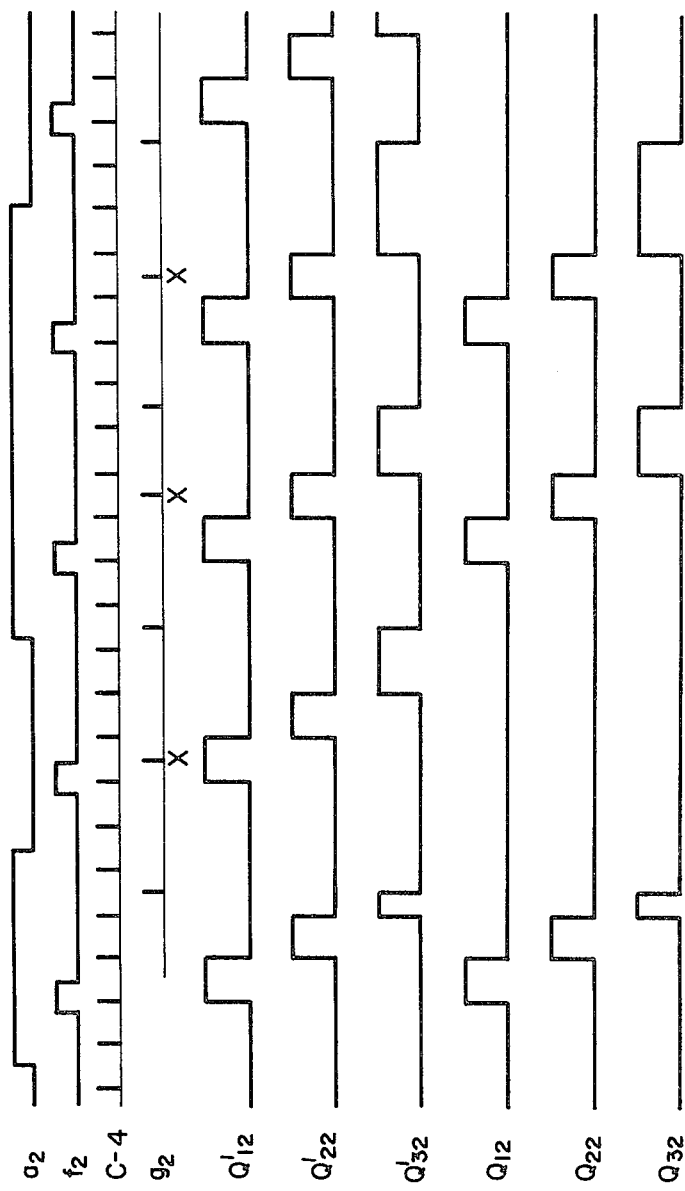
Figure 18:
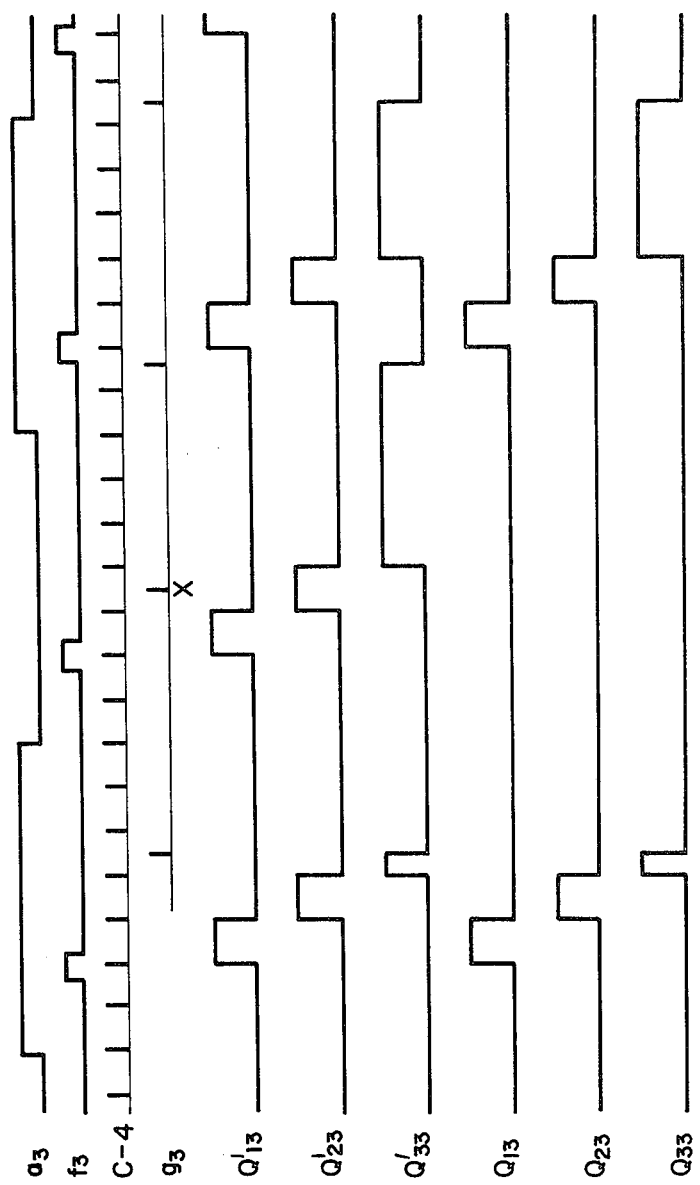

The same operations are carried out for the buffer circuits 6-2 and 6-3. The operations for the signals $a_2$ and $a_3$ have waveforms illustrated in FIGS. 17 and 18, respectively. In the figures, the same kind of waveforms are assigned the same symbol, and suffixes are used for distinguishing the buffer circuits 6-2 and 6-3.

Figure 19:
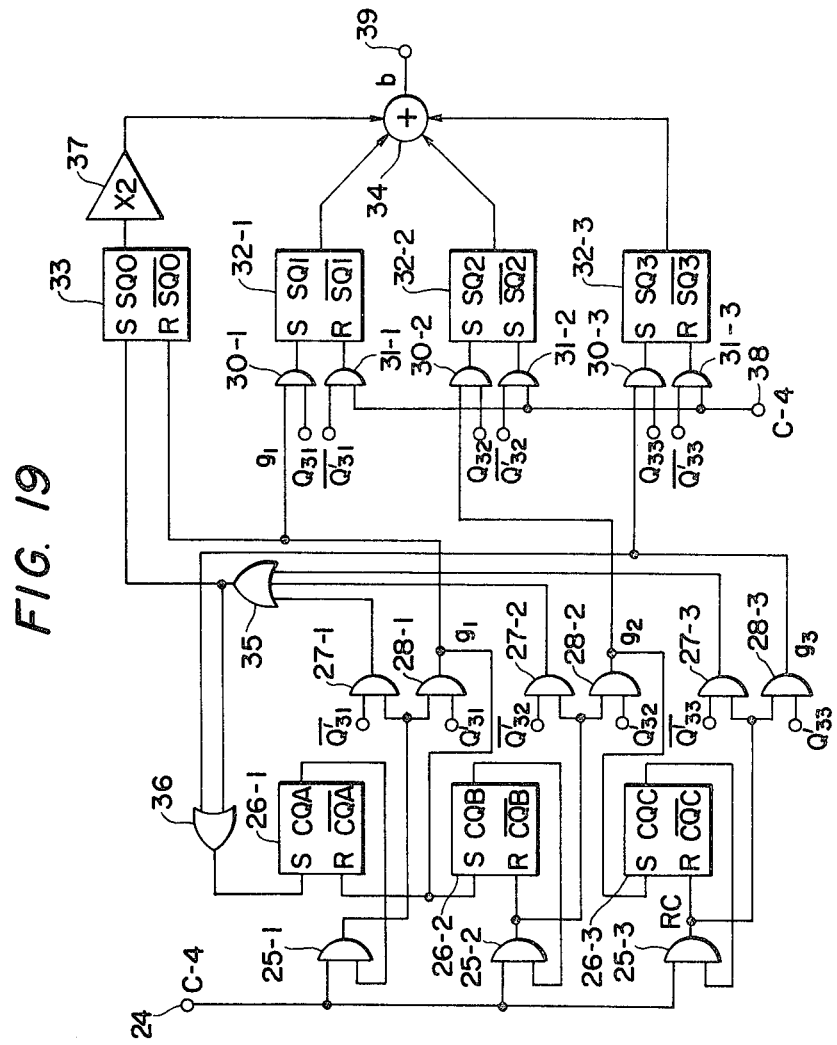
FIG. 19 is a circuit diagram of an embodiment of a multiplexing encoder in FIG. 8.

FIG. 19 is a circuit diagram showing the construction of an embodiment of the multiplexing encoder 7 in FIG. 8. The clock signal c-4 which determines the timing of the transmission line is applied to a terminal 24. Flip-flops 26-1, 26-2 and 26-3 are circuits for determining which of the buffer memory circuits 6-1, 6-2 and 6-3 the signal is to be read out from. AND gates 27-1, 27-2 and 27-3 respectively read out signals from terminals $\overline{Q'_{31}}$, $\overline{Q'_{32}}$ and $\overline{Q'_{33}}$, i.e., signals from the portions for indicating the presence or absence of the signals in the buffer circuits corresponding to the respective channels (the signals correspond to the output $\overline{Q'_3}$ of the flip-flop 6-13 in FIG. 12) at times synchronous with the clock signal c-4. AND gates 28-1, 28-2 and 28-3 respectively read out signals from terminals $Q'_{31}$, $Q'_{32}$ and $Q'_{33}$, i.e., signals at $Q'_3$ of the flip-flop 6-13 of the signal presence displaying portion in FIG. 12 as correspond to the respective channels, by the use of signals synchronous with the clock c-4. AND gates 30-1, 30-2 and 30-3 are circuits which respectively read out signals from terminals $Q_{31}$, $Q_{32}$ and $Q_{33}$ (corresponding to the signal on the terminal $Q_3$ of the flip-flop 6-16 of the buffer circuit in FIG. 12) by the use of the outputs of the AND gates 28-1, 28-2 and 28-3. AND gates 31-1, 31-2 and 31-3 respectively read out signals of terminals $\overline{Q'_{31}}$, $\overline{Q'_{32}}$ and $\overline{Q'_{33}}$ (corresponding to the terminal $\overline{Q'_3}$ of the flip-flop 6-13 of the buffer circuit in FIG. 12) by the use of the clock signal c-4, and provide reset signals to flip-flops 32-1, 32-2 and 32-3. Numerals 25-1, 25-2 and 25-3 indicate AND gates, numerals 35 and 36 OR gates, numeral 33 a flip-flop circuit, numeral 37 an amplifier, and numeral 34 an adder circuit.

Hereunder, the operation of the circuit of FIG. 19 will be described with reference to the above time charts and time charts in FIG. 20.

The initial state is assumed to correspond to a time of point $t_1$ for reading the state of the first signal $a_{11}$ ("1") in the first channel or the signal $a_1$. Accordingly, the terminal CQA of the flip-flop 26-1 is in the state of "1", and the terminal CQB of the flip-flop 26-2 as well as the terminal CQC of the flip-flop 26-3 is in the state of "0". When the clock signal c-4 is applied, it is applied to the AND gates 27-1 and 28-1 through the AND gate 25-1. Since the terminal $Q'_{31}$ of the buffer memory is of "1", the aforecited clock signal passes through the AND gate 28-1 and is applied to the AND gate 30-1 as a reading clock signal $g_1$. The content of the terminal $Q_{31}$ of the buffer memory is read out, and the output $SQ_1$ of the flip-flop 32-1 is set to the value. Since this output is reset after one clock period by the clock signal arriving through the gate 31-1 from the terminal 38, the pulse $a_{11}$ having a width of one clock period is generated at an output end 39 via the adder circuit 34. Simultaneously, the reading pulse $g_1$ being the output of the AND gate 28-1 shifts the reading to the next stage on the basis of the next clock signal, so that the flip-flop 26-2 is set and that the flip-flop 26-1 is reset.

When the next clock signal has come, it is applied to the gates 27-2 and 28-2 via the gate 25-2, but only the gate 28-2 generates a signal $g_2$. Similarly to the foregoing, the output terminal $SQ_2$ of the flip-flop 32-2 provides the signal $a_{21}$, and simultaneously, the output CQC of the flip-flop 26-3 is made "1". The output $SQ_3$ of the flip-flop 32-3 is similarly made "1" by the next clock signal.

The above description corresponds to the case where the signals are stored in the buffer memories 6-1, 6-2 and 6-3 in FIG. 8, that is, where the output terminal $Q'_3$ of the flip-flop 6-13 in FIG. 12 is "1". However, if the buffer memory is "empty", the gate 27-1, 27-2 or 27-3 in FIG. 19 provides the output. Through the OR gate 35 or 36, the output sets the flip-flop 26-1 so that the signal of the buffer memory 6-1 (FIG. 8) can be read at the next reading point of time. In the absence of the signal of the buffer memory 6-1, the flip-flop 26-1 is set again at the next reading point of time so that the still next reading can be made from the buffer memory 6-1. Simultaneously, the flip-flop 33 is set. At the reading time point of this flip-flop, the output signal amplitude of the output terminal $SQ_0$ is doubled by the amplifier 37 and applied to the adder 34, and the applied signal is read from the output terminal 39 as a redundant signal $X_1$ (a signal of level $v_2$ at a point of time $t_5$ as shown at b in FIG. 20). The amplifier 37 is unnecessary if the output level of the flip-flop 33 is twice as large as that of the other flip-flop 32-1, 32-2 or 32-3.

The speciality of the flip-flop 26-1 resides in the construction wherein even when the flip-flop is of "1" itself, it does not reset itself immediately, but it resets itself after having confirmed through the gate 28-1 that the buffer memory is not "0".

Figure 20:
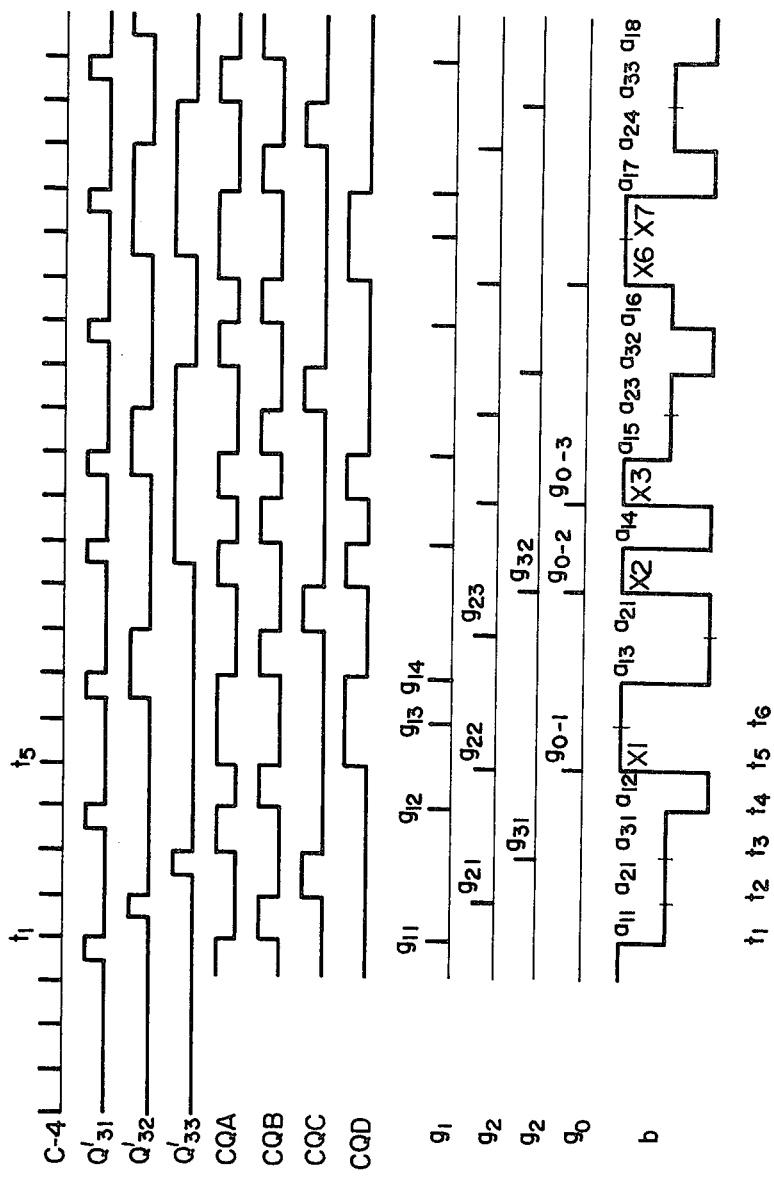
FIG. 20 is a time chart for explaining the operation of the circuit of FIG. 19.

It will be understood from the above operations that the plurality of original signals having arbitrary bit rates are delivered as the multiplexed signal synchronous with the transmission line as shown by b in FIG. 9 or by b in FIG. 20.

Description will now be made of the construction and operation of the receiving side for distributing the multiplexed signal and reconstructing the original signals with the arbitrary bit rates. The distribution and reconstruction are performed by operations inverse to the signal format conversion on the sending side in principle, and will be described in detail below.

Figure 21:
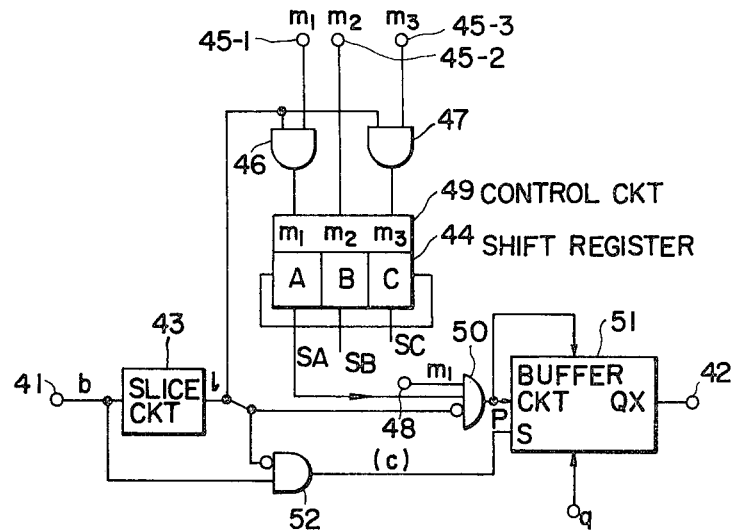
FIG. 21 is a circuit diagram of an embodiment of a receiving circuit for use in the digital signal transmission system according to this invention.
Figure 22:
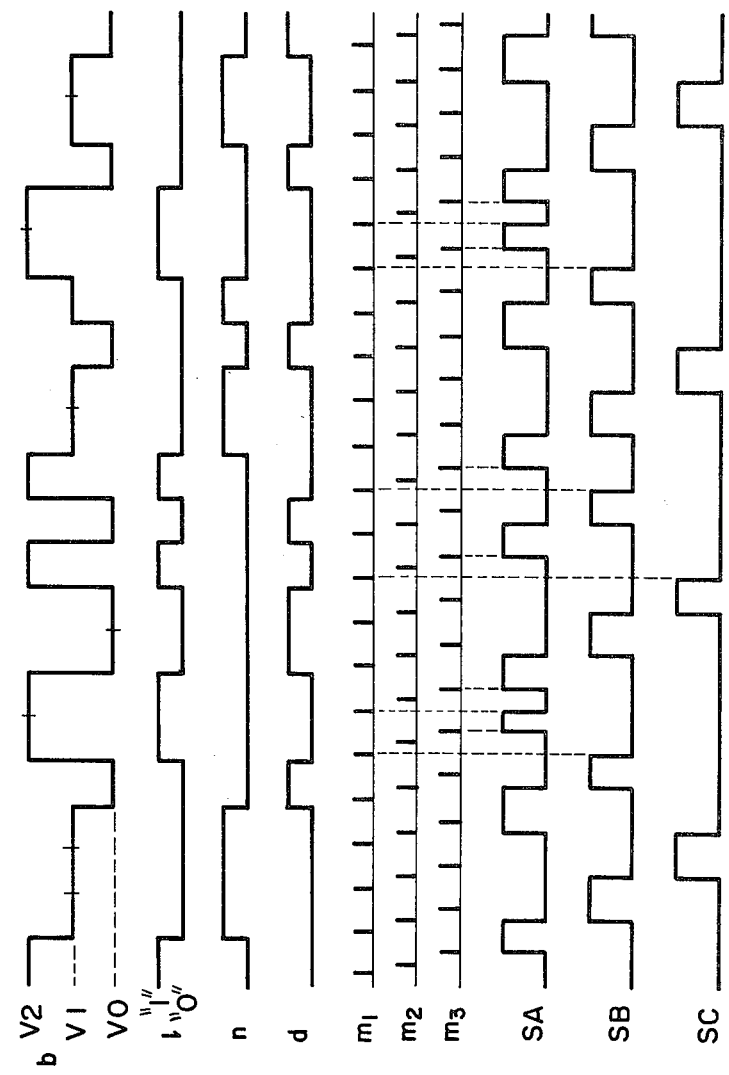
FIG. 22 is a time chart for explaining the operation of the circuit of FIG. 21.

FIG. 21 is a circuit diagram showing the construction of a signal format converter in the receiving terminal applied to the data transmission system according to this invention, while FIG. 22 is a time chart for explaining the operation of the converter.

The multiplexed signal b having been transmitted and received is applied to an input terminal 41. The signal b has its waveform changed into a signal l by means of a slicer 43. That is, the redundant signals higher than the level $v_1$ in the received signal b are converted into "1", and the other signals "0". Clock signals of three pulses with phase differences of $\tau/3$ among them as illustrated at $m_1$, $m_2$ and $m_3$ in FIG. 22 are respectively applied to terminals 45-1, 45-2 and 45-3. These clock signals $m_1$, $m_2$ and $m_3$, AND circuits 46 and 47, and a shift register-control circuit 49 are used as follows. The clock $m_1$ resets a shift register 44 when the redundant pulse signal l is "1". That is, all the outputs of stages A, B and C of the register 44 become "0". The clock $m_3$ presets the shift register so that only the stage A may become "1". The clock $m_2$ shifts the content of the shift register circulatively. The output waveforms of the stages A, B and C of the shift register 44 obtained with such operations are indicated at SA, SB and SC in FIG. 22, respectively.

Now, a circuit for separating the original signal $a_1$ from the multiplexed signals will be explained. An AND gate 50 receives the clock signal $m_1$ through a terminal 48, the signal SA from the shift register, and the redundant pulse signal l is used for inhibiting the gate. The output of the AND gate 50 is used as a write instruction pulse p for a buffer memory 51. The operating principle of the buffer memory 51 is substantially the same as illustrated in FIG. 7, and symbols p, S, q and $Q_x$ in FIG. 21 correspond respectively to $f_1$, $D_1$, $g_1$ and $Q_x$, so that the details of the buffer memory 51 are omitted. In the present embodiment, the buffer memory is constructed of one stage. A signal n (FIG. 22) obtained in such a way that the transmission signal b is passed through an AND gate 52 only in periods in which the redundant signal l is not "1" is applied to the signal input terminal S of the buffer memory 51, and it is loaded into the memory 51 by the write instruction pulse p. It is read out by a read instruction pulse q separately obtained (equal in the clock period to the original signal), and the separated and reconstructed original signal $a_1$ is obtained from an output terminal 42.

The read instruction pulses q can be readily obtained with a voltage oscillator which is controlled so that the generated pulse frequency may become equal to that of the write instruction pulses p.

Regarding the stages B and C of the shift register 44, circuits similar to the buffer circuit 51 and the AND gate circuit 50 are disposed for the respective signals (though not shown), and the original signals $a_2$ and $a_3$ are separated and reconstructed.

Although, in the above, the embodiments employing the signals multiplexed on the basis of the principle of FIG. 9 have been stated, it is to be understood that other systems can be similarly performed. For example, in case of FIG. 10 where the time slot length is made variable, a delay corresponding to the time slot length may be inserted before a shift to the next state on the sending side. The detection of the time slot length on the receiving side can be simply realized by employing a shift register as shown in FIG. 23.

Figure 23:
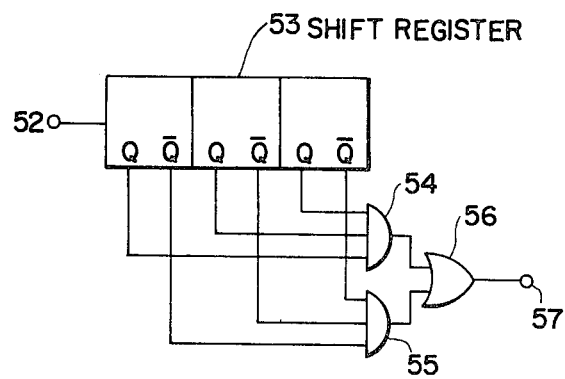
FIG. 23 is a circuit diagram of a redundant pulse detector for use in an embodiment of this invention.

FIG. 23 illustrates an embodiment for detecting a time slot of three bit lengths. A signal received at an input terminal 52 is applied to a shift register of three bit lengths. Outputs from the positive logic terminals Q of the respective bits are used to detect the succession of "1" over the three bit lengths by means of an AND gate 54, while outputs from the negative logic terminals $\overline{Q}$ are used to detect the 3-bit succession of "0" by means of an AND gate 55. By adding the outputs of the AND gates with an OR gate 56, redundant pulses can be detected.

Figure 24:
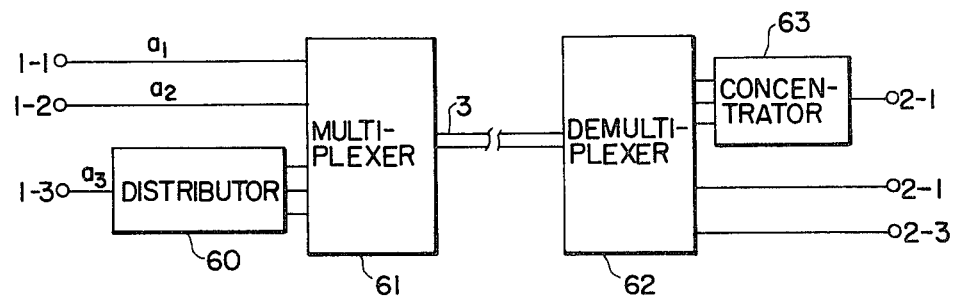
FIG. 24 is a diagram for explaining the principle of a signal distributing system for enhancing the efficiency of this invention.
Figure 25:
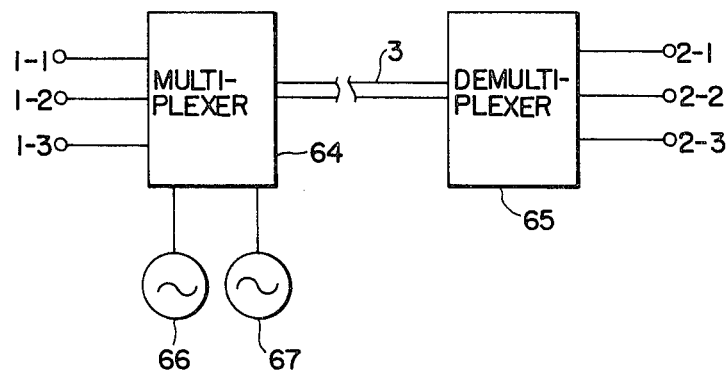
FIG. 25 is a diagram for explaining the principle of an adaptor for multiplexing signals of very close repetition frequencies in this invention.

FIGS. 24 and 25 are block diagrams each showing the construction of another embodiment in the case of carrying out the multiplexed transmission in the digital transmission system according to this invention. Particularly, the embodiment of FIG. 24 is effective when the difference of the highest bit rate $f_1$ and the lowest bit rate $f_n$ is great among a plurality of signals to be multiplexed and transmitted, and the embodiment of FIG. 25 is applied to a case where bit rates are close among a plurality of signals and where the order of the magnitudes of the bit rates is liable to change with time.

Referring to FIG. 24, signals $a_1$, $a_2$ and $a_3$ of unequal bit rates at frequencies $f_1$, $f_2$ and $f_3$ are respectively applied to input terminals 1-1, 1-2 and 1-3. Especially, when the frequency $f_3$ of the signal $a_3$ is very high, it is divided by three by means of a distributor 60, and the lowered frequency signal is applied to a multiplexer 61. The construction of this multiplexer is the same as shown in FIG. 8. The multiplexed signal is transmitted through the transmission line 3, and is decoded by a demultiplexer 62 in a receiving portion. The signals distributed on the sending side are restored into the 1-channel signal by a concentrator 63. Thus, received signals are respectively obtained from output terminals 2-1, 2-2 and 2-3.

In the embodiment of FIG. 25, the bit rates $f_1$, $f_2$ and $f_3$ of signals $a_1$, $a_2$ and $a_3$ to be applied to input terminals 1-1, 1-2 and 1-3 are so proximate that arranging signal in order of bit rate is impossible. This problem is solved by applying dummy signals to original signals. In a multiplexer 64, a dummy signal 66 being a low frequency signal $\Delta f_1$ is added to the signal $a_1$, and a dummy signal 67 being also another low frequency signal $\Delta f_2$ is added to the signal $a_2$, whereby the frequencies of the respective signals $a_1$ (at $f_1$), $a_2$ (at $f_2$) and $a_3$ (at $f_3$) are endowed with substantial differences. For example, in case where the time slot length of the redundant signal is three time slots, the succession of "1" or "0" more than four or more time slots may be used as the dummy signal. More concretely, in case of multiplexing and transmitting three channels of signals at $1.544$ Mb/s $\times (1 \pm 10^{-5})$, the proportion of the addition of the dummy signal is varied depending upon the signals, e.g. $f_1 = 1.546$ Mb/s $\times (1 \pm 10^{-5})$, $f_2 = 1.545$ Mb/s $\times (1 \pm 10^{-5})$ and $f_3 = 1.544$ Mb/s $\times (1 \pm 10^{-5})$. On the receiving side, as in the foregoing embodiment, the dummy signals are removed by a demultiplexer 65 with note taken of their run lengths and the original signals are decoded and obtained from output terminals 2-1, 2-2 and 2-3.

While, in the above, this invention has been described along the embodiments, it is not restricted thereto, but by way of example it includes a case where RZ signals are used by converting them into the NRZ signals. Although the examples of using the redundant pulses and the signals pulses have been explained here, it is to be understood that in case of the multiplexing, a method in which one or more empty pulses (differing in the level and or in the length of succession) are employed instead when the next pulse has not come, can be similarly realized. According to this invention, asynchronous signals are permitted to be multiplexed and synchronized and then transmitted to a transmission line as may be needed. This greatly contributes to the enhancement of flexibility in constructing communication circuits, and brings forth great effects in economy and in maintenance and operation.

We claim:

1. A digital signal transmission system wherein input digital signals are converted on a bit-by-bit basis into digital signals with a bit rate higher than that of the input digital signals by a signal format converter and then transmitted over a media having a given transmission speed, said signal format converter comprising a buffer circuit, writing means for writing the input signals into said buffer circuit at the bit rate of said input signals, reading means for reading out the written signals from said buffer circuit at a bit rate which is higher than that of said input signals and is equal to said transmission speed, and an encoder which discerns a mark and a space of the read signals and an empty representative of the non-existence of any signal to be read out and which, in case of the empty, inserts a dummy signal which is distinguishable from signals corresponding to the mark and the space by amplitude or pulse duration.

2. A digital signal transmission system according to claim 1, wherein said encoder includes means for adding a pulse when said buffer circuit has no signal to be read out, said pulse having a level different from those of the converted signals of the mark and the space of the signals to be transmitted.

3. A digital signal transmission system according to claim 1, wherein said encoder includes means for converting the read signal from said buffer circuit corresponding to said mark into a signal with a predetermined run length, means for converting the read signal corresponding to said space into a signal with another predetermined run length, and means for converting the non-existence of any signal to-be-read-out in said buffer circuit into a signal with a run length different from those of the cases of said mark and said space.

4. A digital signal transmission system according to claim 1, wherein said encoder includes means for converting the read signal corresponding to the mark into a signal with a run length even (or odd) times a clock period of a transmission line, means for converting the read signal corresponding to the space into a signal with a run length odd (or even) times said clock period of said transmission line, and means responsive to the non-existence of any signal to be read out for adding a number of succession of a signal level to the converted signals of said mark and said space so as to fulfill the above conditions.

5. A digital signal transmission system according to claim 1, wherein there are a plurality of input signals having arbitrary bit periods; said signal format converter including a plurality of buffer circuits connected respectively to receive a respective one of said plurality of input signals, said writing means including means for writing said input signals into said buffer circuits at respective bit periods of said input signals and said reading means including means for reading the written signals out of said buffer circuits at a common reading bit period and successively in the order in which the bit periods of the respective input signals are shorter, and after reading out the signal of the longest bit period the signal of the shortest bit period is read out again, and in the nonexistence of any signal to-be-read-out a redundant signal is added and thereafter the buffer circuit corresponding to the signal of the shortest bit period is returned to and has its content read out.

6. A digital signal transmission system according to claim 1, wherein said encoder includes means for inserting in an empty a dummy signal which is distinguishable from the mark and the space in terms of the intervals between two adjacent pulse transients.

7. A digital signal transmission system according to claim 1, wherein said encoder includes means for inserting in an empty a dummy signal which is distinguishable from the mark and the space in terms of pulse amplitude.

8. A digital signal transmission system according to claim 1, wherein said buffer circuit includes means responsive to said reading means for providing a first output corresponding to the mark in said input signals and a second output corresponding to an empty.

9. A digital signal transmission system according to claim 8, wherein said encoder includes first level converter means responsive to said first output of said buffer circuit for generating a pulse at a first amplitude level, second level converter means responsive to said second output of said buffer circuit for generating a pulse at a second amplitude level, and means for combining the outputs of said first and second level converter means.

10. A digital signal transmission system according to claim 9, wherein said combining means is an OR gate.

11. A digital signal transmission system according to claim 8, wherein said encoder includes first pulse expander means responsive to said first output of said buffer circuit for generating a pulse having a first pulse duration, second pulse expander means responsive to said second output of said buffer circuit for generating a pulse having a second pulse duration, and means for combining the outputs of said first and second pulse expander means.

12. A digital signal transmission system according to claim 11, wherein said combining means includes a gate having first and second inverting inputs connected respective to said first and second pulse expander means and a third non-inverting input connected to said reading means, and a flip-flop having its input connected to the output of said gate.

13. A digital signal transmission system according to claim 11, wherein said combining means includes a first gate having first and second inverting inputs connected respectively to said first and second outputs of said buffer circuit and a third non-inverting input connected to said reading means, a second gate having first and second inverting inputs connected respectively to the outputs of said first and second pulse expander means and a third non-inverting input connected to said reading means, the output of said second gate being connected to said buffer circuit, an AND gate having one input connected to said first output of said buffer circuit and a second input connected to said reading means, an OR gate having respective inputs connected to the outputs of said first gate and said AND gate, and a flip-flop having its input connected to the output of said OR gate.

* * * * *